United States Patent Office 2,908,678
Patented Oct. 13, 1959

2,908,678

WATER-INSOLUBLE 6-AMINO-2,4-DIOXO-TETRA-HYDROQUINAZOLINE MONOAZO DYESTUFFS

Hermann Goebel, Leverkusen, and Gerd Muller, Koln-Flittard, Germany, assignors to Farbenfabriken Bayer Aktiengesellschaft, Leverkusen, Germany, a corporation of Germany No Drawing. Application January 16, 1957
Serial No. 634,418

Claims priority, application Germany January 20, 1956

8 Claims. (Cl. 260—154)

The present invention relates to water insoluble monoazo dyestuffs and to a process for their manufacture; more particularly it relates to monoazo dyestuffs being free of sulfonic acid and carboxylic acid groups and corresponding to the general formula

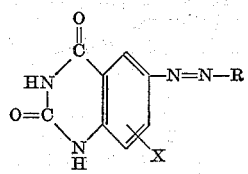

in this formula R means a radical of a coupling component and X stands for hydrogen or a non-ionic substituent.

The new azo dyestuffs are obtainable by combining diazotized 6-amino-2,4-dioxo-tetrahydroquinazolines, in substance or on a substrate, with a coupling component, the components being free of sulfonic acid and carboxylic acid groups.

As coupling components there may be used, for example, the arylamides of 2-hydroxynaphthalene-3-carboxylic acid, phenylpyrazolones, acylacetic acid arylamides or 2,4-dihydroxyquinolines. They are chosen so as not to contain sulfonic acid or carboxylic acid groups.

The 6-amino-2,4-dioxo-tetrahydroquinazolines used as diazo components may contain in the benzene nucleus the usual non-ionic substituents such as halogen-, nitro-, alkyl-, substituted alkyl-, sulfone- or sulfonamide groups. They may be obtained by known processes, for example by the reaction of 2-amino-5-acetylamino-benzoic acids with potassium cyanate and subsequent saponification.

The new dyestuffs are suitable for coloring lacquers, plastics, rubber and printing pastes used for pigment prints. They can also be used for the preparation of printing colors and for the production of fibres dyed in the spinning process. The dyeings obtainable with the new dyestuffs have good general fastness properties. Lacquer coatings are distinguished by an excellent resistance to solvents.

The following examples are given for the purpose of illustrating the invention without, however, limiting it thereto.

Example 1

17.7 grams of 6-amino-2,4-dioxo-tetrahydroquinazoline are diazotized in conventional manner. The diazonium salt solution is treated with acetic acid and an alkyl sulfonate. A solution of 32.3 grams of 1-(2',3'-hydroxynaphthoylamino)-2-methoxybenzene, dissolved in dilute sodium hydroxide, is run into it with stirring. The resultant weakly acid suspension is heated to 40° C. until the coupling is completed. The dyestuff thus obtained is filtered with suction, washed, dried and ground. It corresponds to the formula

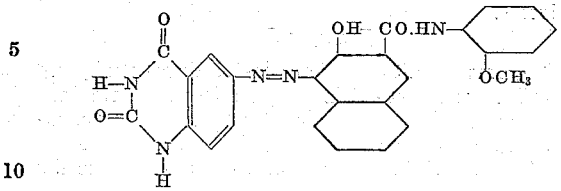

and is a dark red powder which yields in the working up of lacquer a bright Bordeaux color of excellent resistance to solvents and overspraying.

A textile print produced with this dyestuff shows upon coating with polyvinyl chloride a blue-red shade. The dyeing exhibits very good resistance to migration.

Example 2

39.5 grams of 1-(2',3'-hydroxynapththoylamino)-2,4-dimethoxy-5-chlorobenzene are dissolved in dilute sodium hydroxide. After cooling the solution and adding an alkyl sulfonate, the coupling component precipitates in finely dispersed form upon addition of acetic acid. A diazonium salt solution which was prepared in usual manner from 17.7 grams of 6-amino-2,4-dioxo-tetrahydroquinazoline is added thereto with stirring. Upon a brief heating to 40° C., the coupling is completed. The dyestuff which corresponds to the formula

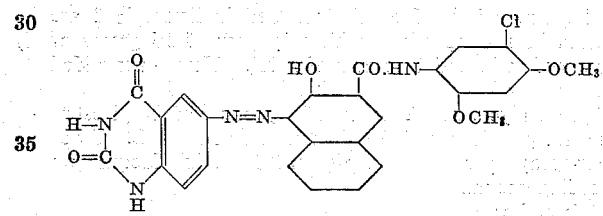

is filtered off, washed and dried. It is a dark red powder which is excellently suited for the purposes indicated in Example 1.

Example 3

19.5 grams of acetic acid anilide are dissolved in dilute sodium hydroxide and the product is precipitated again by means of acetic acid. To the resultant suspension a diazonium salt solution of 17.7 grams of 6-amino-2,4-dioxo-tetrahydroquinazoline is added. After a short time the coupling is completed and the dyestuff thus formed is filtered off, washed, dried and ground. It corresponds to the formula

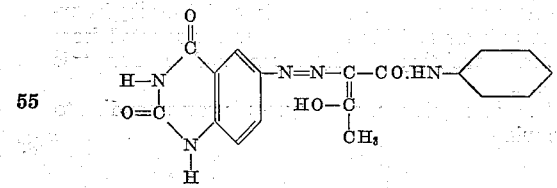

The powder thus obtained is greenish yellow and distinguished by its very good resistance to solvents.

Example 4

17.7 grams of 6-amino-2,4-dioxo-tetrahydroquinazoline are diazotized in the usual manner and the diazonium salt solution is added to a solution of 17.7 grams of 2,4-dihydroxyquinoline in dilute ammonia. The coupling is immediately completed. After the usual working up, the dyestuff corresponding to the formula

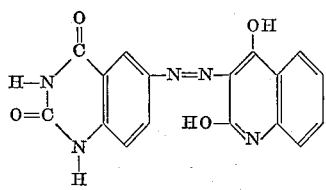

is an orange-colored powder having a very good resistance to solvents.

Example 5

32.2 grams of nitrated 6-amino-2,4-dioxo-tetrahydroquinazoline are diazotized in usual manner and combined with a solution of 32.2 grams of 1-(2',3'-hydroxynaphthoylamino)-2-methoxybenzene in dilute sodium hydroxide. The dyestuff thus formed which corresponds to the formula

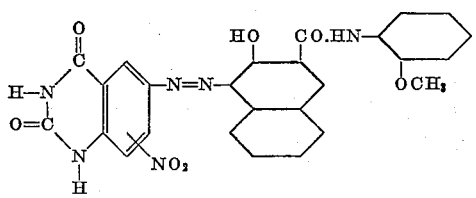

is after working up a dark red powder which has an excellent resistance to solvents.

For the production of the nitrated 6-amino-2,4-dioxo-tetrahydroquinazoline, the base is acetylated, nitrated in sulfuric acid at −5° C. with concentrated nitric acid, isolated and subsequently saponified. It may be assumed that the 7-nitro compound is obtained.

Example 6

4 grams of the dyestuff described in Example 2 are pasted in a hopper mill with a lacquer of 56 grams of an alkyd resin and 17 grams of xylol. Hereto are added 12 grams of melamineformaldehyde resin, 13 grams of ethylene glycol and 2 grams of glycolic acid butyl ester. The lacquer is stoved for 40 minutes at 130° C. After over-spraying with white pigmented stoving lacquer no bleeding occurs.

We claim:

1. Water-insoluble monoazo dyestuffs corresponding to the formula

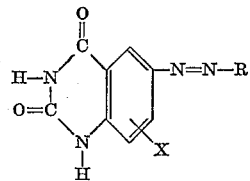

wherein R stands for a member selected from the group consisting of 2,3-hydroxynaphthoic acid arylamide radicals, acetoacetyl arylamide radicals and 2,4-dihydroxyquinoline radicals and X means a member selected from the group consisting of hydrogen and a non-ionic substituent.

2. Water-insoluble monoazo dyestuffs corresponding to the formula

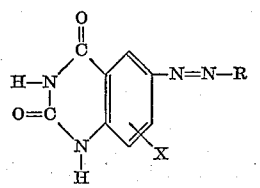

wherein R stands for a 2-hydroxynaphthalene-3-carboxylic acid arylamide linked in o-position to the hydroxyl group and X means a member selected from the group consisting of hydrogen and a non-ionic substituent.

3. Water-insoluble monoazo dyestuffs corresponding to the formula

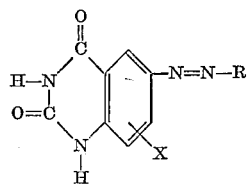

wherein R stands for an acylacetic acid arylamide linked in o-position to the enolic hydroxyl group and X means a member selected from the group consisting of hydrogen and a non-ionic substituent.

4. Water-insoluble monoazo dyestuffs corresponding to the formula

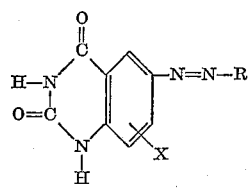

wherein R stands for a 2,4-dihydroxy-quinoline attached to the heterocyclic nucleus in 3-position and X means a member selected from the group consisting of hydrogen and a non-ionic substituent.

5. Water-insoluble monoazo dyestuffs corresponding to the formula

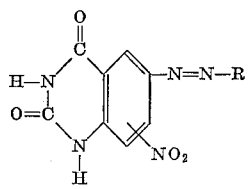

wherein R stands for a 2-hydroxynaphthalene-3-carboxylic acid arylamide linked in o-position to the hydroxyl group.

6. The monoazo dyestuff corresponding to the formula

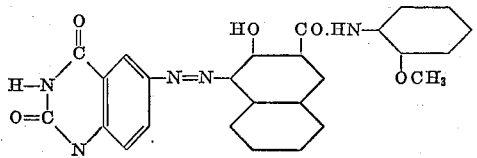

7. The monoazo dyestuff corresponding to the formula

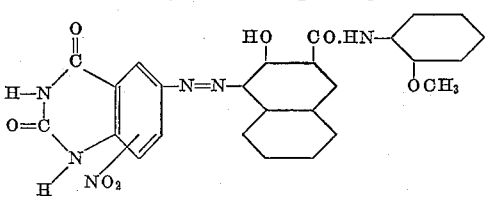

8. The monoazo dyestuff corresponding to the formula

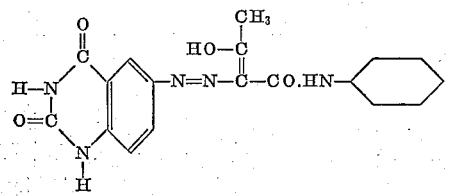

References Cited in the file of this patent

UNITED STATES PATENTS 1,012,055    Bogert     Dec. 19, 1911